April 22, 1930.  P. G. GADDIS  1,755,251
DISTRIBUTOR SPIKE
Filed Feb. 23, 1929   2 Sheets-Sheet 1
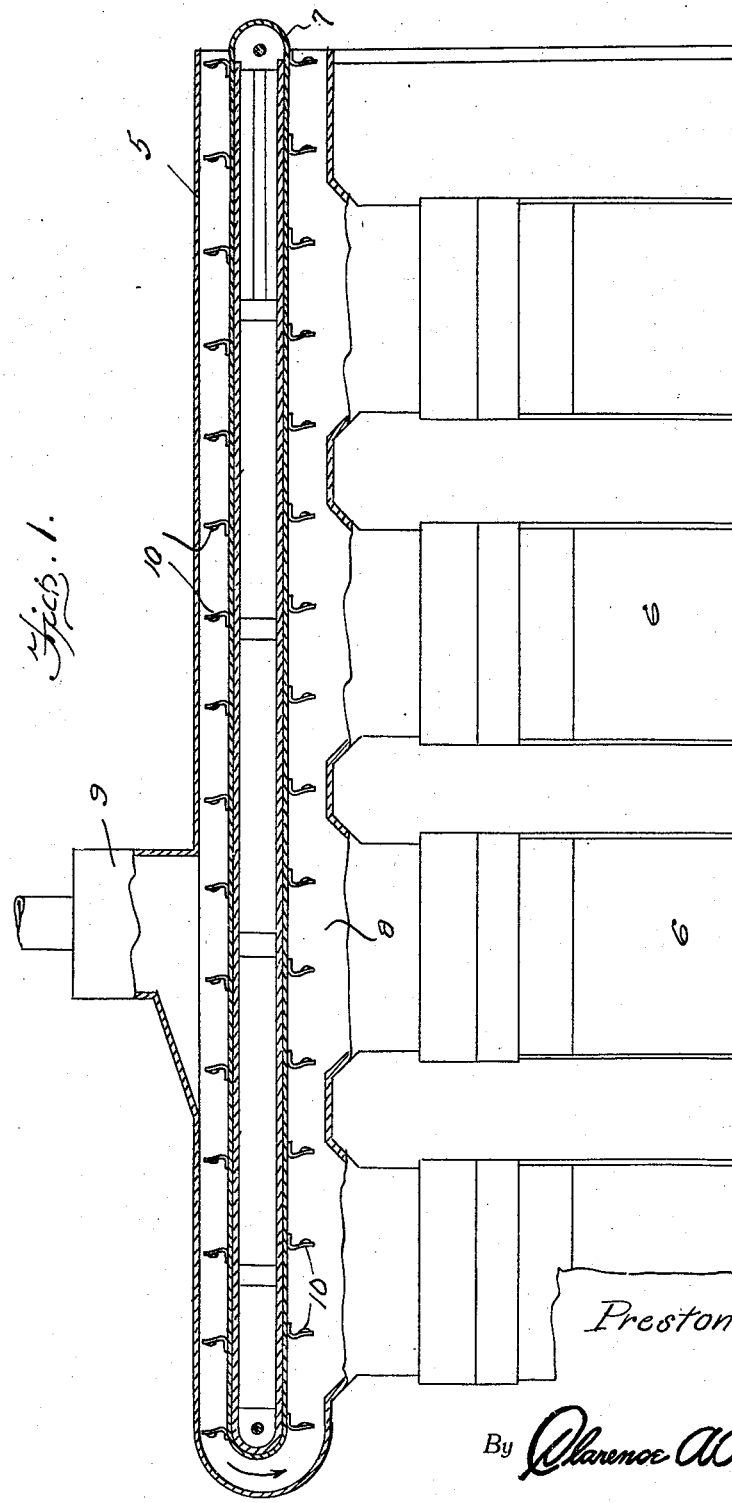
Inventor
Preston G. Gaddis
By Clarence A. O'Brien
Attorney April 22, 1930.                P. G. GADDIS                1,755,251
                              DISTRIBUTOR SPIKE
                          Filed Feb. 23, 1929        2 Sheets-Sheet 2
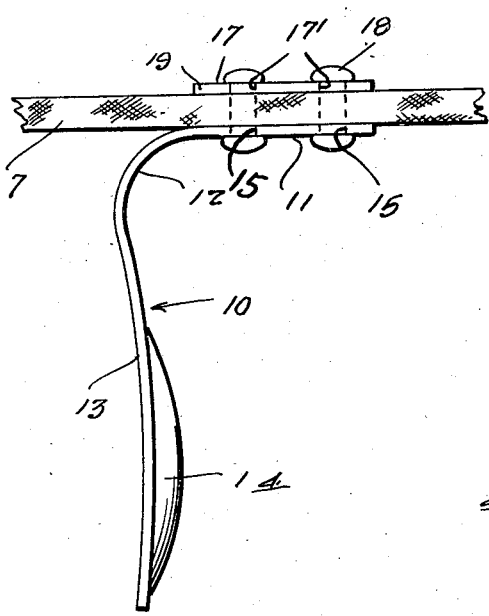
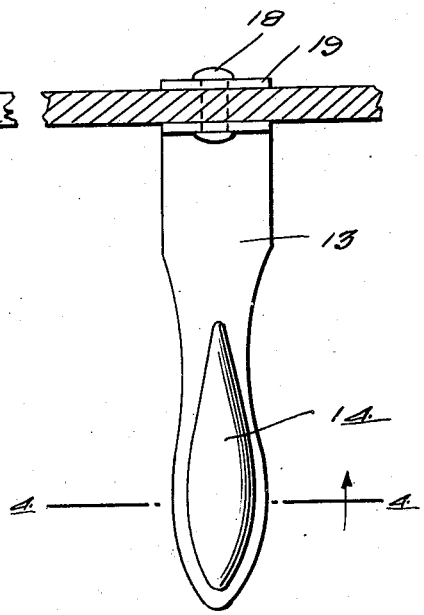
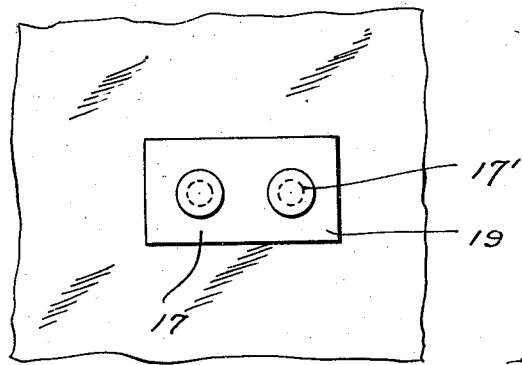
Inventor
Preston G. Gaddis
By Clarence A. O'Brien
                    Attorney Patented Apr. 22, 1930

1,755,251

UNITED STATES PATENT OFFICE

PRESTON G. GADDIS, OF OKLAHOMA CITY, OKLAHOMA

DISTRIBUTOR SPIKE

Application filed February 23, 1929. Serial No. 342,042.

This invention relates to an improved distributor spike, and more especially for a distributor spike for use on a distributor belt in a cotton gin.

The primary object of this invention is to provide a distributor spike to be fastened to the distributor belt of a cotton gin, which spike is to be formed of a resilient material, the spike being of sufficient stiffness to handle all loads of cotton without bending, but possessed of enough spring, so that upon meeting an obstruction or should a portion of the distributor become choked, instead of breaking loose from the belt, the spike would bend back and pass this obstruction without injury either to the spike or to the belt.

A still further object of the invention is to provide a spike of the character described, which can be manufactured at a relatively low cost, capable of easy attachment to the belt, strong, durable, and otherwise well adapted for the purpose designed.

Further objects and advantages of the invention will become readily apparent from a study of the following description taken in connection with the accompanying drawings, wherein, Figure 1 is a diagrammatic sectional view a cotton gin, showing the distributor belt provided with my improved distributor spike.

Figure 2 is a side elevation of my improved spike, and

Figure 3 is a front elevation of the same.

Figure 4 is a transverse horizontal sectional view taken substantially on the line 4—4 of Figure 3.

Figure 5 is a fragmentary bottom plan view of the belt for fully illustrating the manner of securing the distributor spike thereto.

With reference to the drawings, attention is first invited to Figure 1, wherein is shown the distributor of a cotton gin, which is designated generally as at 5, disposed over a battery of gin stands 6, in the conventional manner. The distributor 5 consists preferably of a wooden or metal trough, through which the distributor belt 7 runs, the belt being endless and in the particular instance, the belt travels from the right to the left. It will be noted on the left end of this distributor, there is an oval or bell shaped end, which allows the spike and the cotton to travel from the top section of the distributor to the bottom section. An opening 8 is formed in the bottom of the distributor directly over each gin stand 6. When the cotton gin is in operation, the cotton is sucked up from the wagon or cotton house (not shown) from the suction pipe into the cleaner 9, where the air and cotton are separated and the seed cotton is then dropped onto the distributor trough.

As the cotton is carried by the belt and forced by the openings 8, a sufficient amount drops down to operate each gin stand.

As the belt travels in an endless manner around the distributor, the spikes 10 are sticking up in the top section of the distributor and as they travel around and feed the gin stands, the spikes are sticking down. The spikes now generally in use are made of malleable iron. Consequently, should they meet an obstruction and the belt is tight, it has a tendency to pull the rivet through the belt and break the fabric, until finally the spike is pulled out. The spike then torn from the belt travels down with the cotton and gets into the gin saws which is a very serious objection.

To overcome this objectional feature, I have provided an improved spike 10, best shown to advantage in Figure 2 of the drawings.

As shown in Figures 2 and 3 my improved spike is of L-shaped formation and is preferably made of tempered spring steel with the spring in the upper portion of the spike. The spike 10 comprises a substantially flat portion 11, bent as at 12, to provide a gradual curve where the spike leaves the belt and turns downward. The vertical portion 13 of the spike may be crimped or concaved as at 14, so that the point of flexibility will be in the upper end of the vertical portion or that portion nearest the belt.

The purpose of so forming the spike is that the upper portion will be stiff enough to handle all loads of cotton without bending, but should the spike meet an obstruction or should a portion of the distributor become choked, the spike, instead of breaking loose from the belt, would have enough spring adjacent the curved portion 12 to allow the upper portion to bend back and pass the obstruction without pulling the rivets through the belt.

To fasten the spike 10 to the belt 7, a pair of spaced openings 15 are formed in the flat portion of the spike, which flat portion is placed on the upper surface of the belt, while a clamping plate 17, provided with a pair of openings 17' is disposed on the upper surface of the belt with the openings 17' in alignment with the openings 15. The spikes and plate 17 then being securely fastened to the belt by means of the rivet 18.

It is yet to be mentioned that the end 16 of the spike 10 rests flatly on the belt as shown in Figure 2 of the drawings, and the ends 19 of the plate 17 also resting on the adjacent surface of the belt.

From the above detailed description, it will be seen that I have provided an exceedingly simple, springy yet sturdy spike for use on the distributor belt of a cotton gin. Of course, this spike may be used on numerous other distributor belts for different purposes as will be quite apparent to those skilled in this art.

It is thought that the present embodiment of the invention will now be more clearly understood without a detailed description thereof.

This embodiment has been disclosed merely by way of example, since in actual practice it attains the features of advantage enumerated as desirable in the statement of the invention and the above description. It will be apparent that changes in the details of construction and in the combination and arrangement of parts may be resorted to, without departing from the spirit of the invention as hereinafter claimed, or sacrificing any of its advantages.

I claim:

1. A device of the character described, in combination, a distributor belt for use in a cotton gin, provided with a plurality of resilient distributor spikes extending at right angles thereto, each of said spikes being formed of flexible spring steel and provided with a substantially flat portion for attachment to the belt, said flat portion terminating at one end to provide a gradual curve terminating in a vertical portion, said vertical portion being crimped at its upper edge to provide a relatively flat section intermediate said curve and one end of the crimp.

2. A device of the character described, in combination, a distributor belt for use in a cotton gin, a distributor spike for the belt, said spike being formed of a single piece of tempered steel or like material bent intermediate its ends to provide a substantially flat portion, and a relatively long vertical portion, said flat portion adapted to rest upon said belt and having openings formed thereon, said vertical portion being concaved adjacent its topmost edge, and relatively flat adjacent the opposite end, a plate having openings formed thereon disposed upon the under surface of the belt with the openings in alignment with said first mentioned openings, and rivets passing through the aligned openings for securing said spike and plate to the belt.

3. A device of the character described, in combination, a distributor belt for use in a cotton gin, an L-shaped spike formed of tempered spring steel or like flexible material and having a relatively short flat portion for attachment to the belt, and a relatively longer spike portion for contact with the articles or materials carried by the belt, and having openings formed in said flat portion, rivets passing through said openings for attaching the spike to the belt, a clamping plate on the opposite surface of the belt through which said rivets protrude.

In testimony whereof I affix my signature.

PRESTON G. GADDIS.